C. H. STARK.

AUTOMATIC CAR COUPLING.

APPLICATION FILED AUG. 18, 1916.

Reissued Oct. 17, 1916.

14,203.

3 SHEETS—SHEET 1.

*Inventor:*

*Charles H. Stark,*

*by Spencer, Middleton, Dorcas & Spencer*

*Attys.*

C. H. STARK.
AUTOMATIC CAR COUPLING.
APPLICATION FILED AUG. 18, 1916.

Reissued Oct. 17, 1916.

14,203.
3 SHEETS—SHEET 2.

Inventor:
Charles H. Stark,
by Pear, Middleton, Donaldson & Pear
Attys.

C. H. STARK.

AUTOMATIC CAR COUPLING.

APPLICATION FILED AUG. 18, 1916.

Reissued Oct. 17, 1916.

14,203.

3 SHEETS—SHEET 3.

Inventor:

Charles H. Stark, by Pierce, Middleton, Duncan & Flint

Atty's.

UNITED STATES PATENT OFFICE.

CHARLES H. STARK, OF STRASBURG, VIRGINIA, ASSIGNOR TO STARK CAR COUPLER CORPORATION, OF STRASBURG, VIRGINIA, A CORPORATION OF VIRGINIA.

AUTOMATIC CAR-COUPLING.

14,203. Specification of Reissued Letters Patent. Reissued Oct. 17, 1916.

Original No. 1,139,382, dated May 11, 1915, Serial No. 826,217, filed March 21, 1914. Application for reissue filed August 18, 1916. Serial No. 115,712.

*To all whom it may concern:*

Be it known that I, CHARLES H. STARK, a citizen of the United States, and a resident of Strasburg, in the county of Shenandoah and State of Virginia, have invented an Improvement in Automatic Car-Couplings, of which the following is a specification.

My present invention relates to car couplings and the primary object thereof is to provide such a car coupling strictly in keeping with the present type or style known as the Janney type or Master Car Builders' coupler but possessing new and improved characteristics such as will eliminate the necessity of persons going between the cars for the purpose of opening the knuckle or placing any part of their body between the cars in order to adjust the knuckle or coupler head. This object I accomplish by the provision of a coupler which will automatically open upon contact of either another coupling of like construction or a standard M. C. B. coupler therewith and which will subsequently and automatically lock in engagement with the other coupler.

A further object of my invention is to provide such a structure that this action may take place when two couplers come together at various angles with respect to one another and out of true line.

Other and further objects of my invention, residing more particularly in the details of construction, arrangement and operation of parts thereof, will be apparent from the following specification in which reference is made to the accompanying drawings forming a part thereof, and in which—

Figure 1:
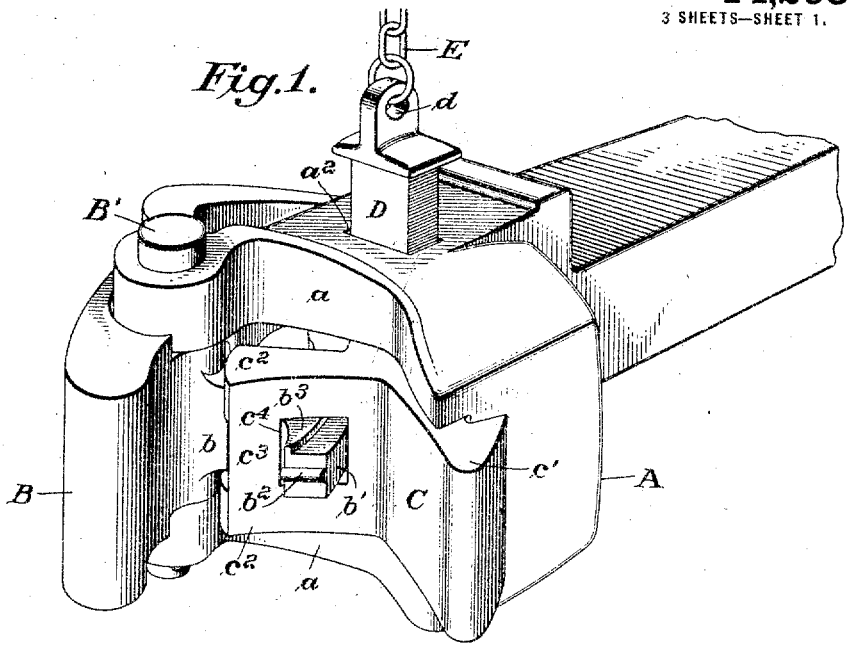
Figure 2:
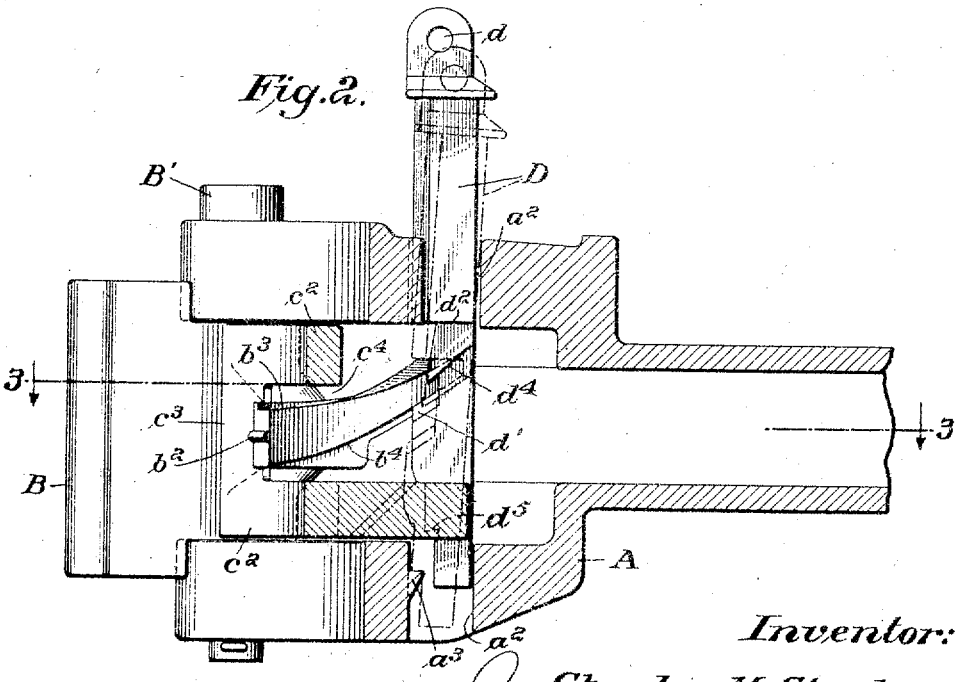
Figure 4:
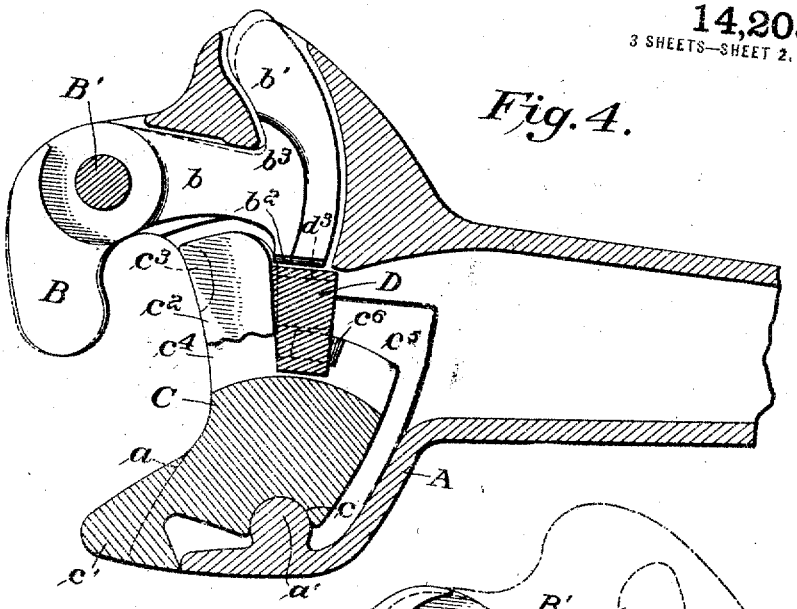
Figure 5:
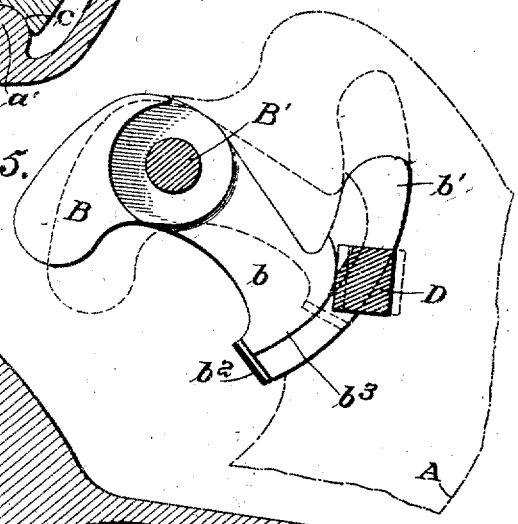
Figure 3:
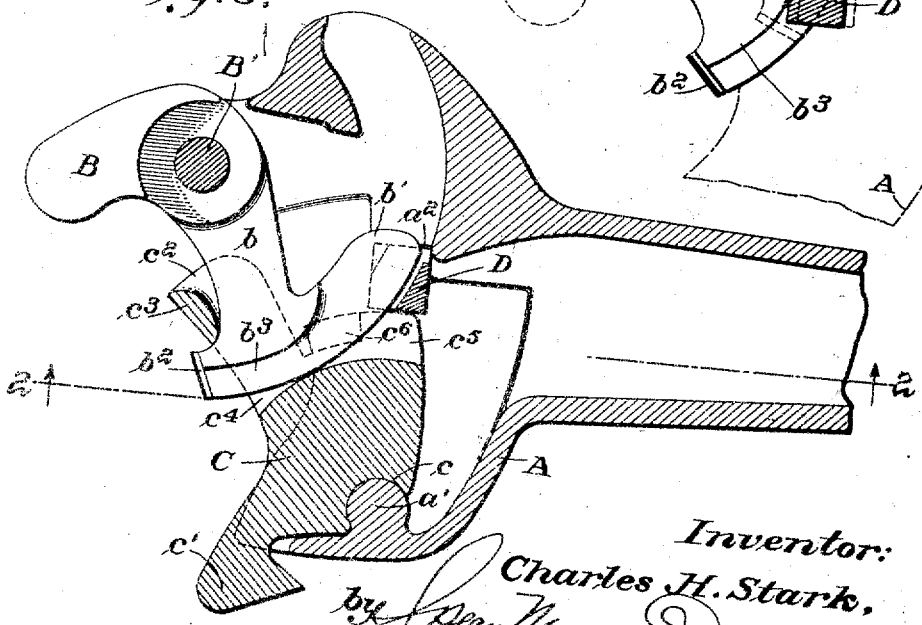
Figure 6:
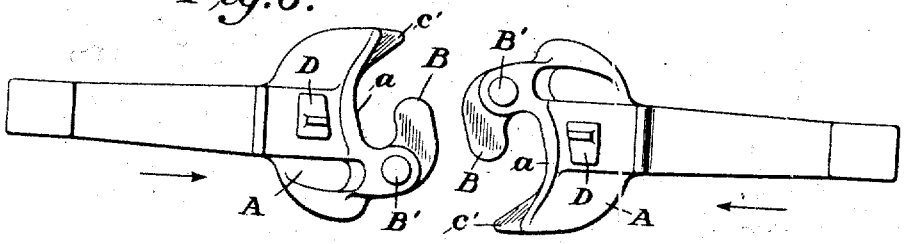
Figure 7:
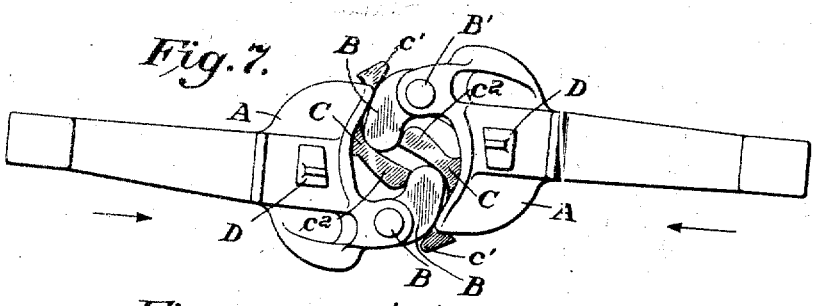
Figure 8:
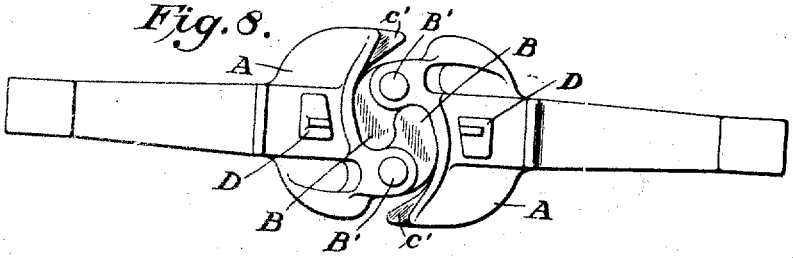
Figure 9:
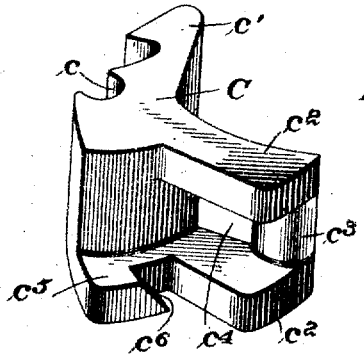
Figure 10:
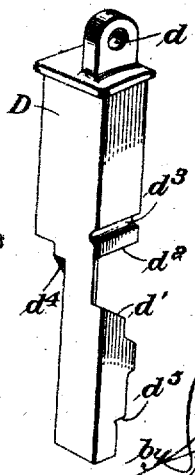
Figure 11:
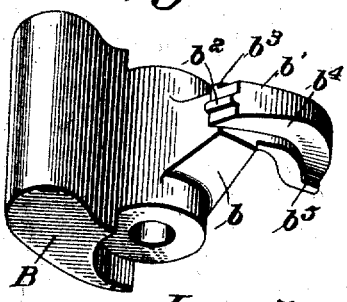

Figure 1 is a perspective view showing a coupling formed in accordance with my invention. Fig. 2 is a vertical longitudinal section taken therethrough substantially on line 2—2 of Fig. 3. Fig. 3 is a horizontal section taken therethrough substantially on line 3—3 of Fig. 2, illustrating the parts in open position. Fig. 4 is a similar view illustrating the parts in locked position. Fig. 5 is a diagram illustrating certain movements of the knuckles to be hereinafter referred to. Fig. 6 is a plan view showing two couplers approaching one another with their parts in locked position. Fig. 7 is a similar view illustrating the same couplers after their initial contact and illustrating their parts in the automatically released position. Fig. 8 is another similar view illustrating the couplers in locked position in engagement with one another. Fig. 9 is a detail perspective view of the guard arm removed. Fig. 10 is a detail perspective view of the locking pin removed, and Fig. 11 is a detail perspective view of the knuckle removed.

Referring now to Figs. 6 to 8 inclusive, I have shown two coupling heads A, each of which is identical in its structure so that a description of one, in connection with the remaining figures, will suffice for a clear understandng of their mutual action and also for an understanding of the action of either of them in connection with a standard M. C. B. coupler. As shown in these and the other figures, each coupler head A has its outer or front face provided at $a$ with a contour line which, with the guard arm, as hereinafter described, in place, substantially forms the standard contour lines of the M. C. B. coupler and is provided at one side with forward extensions forming the bearings for the pin B′ extending through and intermediately pivoting the knuckle B, the inner end of the tail $b$ of which is provided with a segmentally curved extension $b'$ projecting forwardly and rearwardly of the tail, the forwardly projecting end of this extension being provided with a substantially square face having a transversely extending rib $b^2$ for a purpose to be hereinafter described. The upper surface of the extension $b'$ is also provided with a raised cam surface $b^3$, the edge of which is spaced from the free edge of the extension, and the lower surface of this extension is formed with an inclined cam surface $b^4$ terminating, at the outer end of the extension, in a limiting shoulder $b^5$.

At the relatively opposite side of the coupler head A, its wall is formed with an inner vertical rib $a'$, the surface of which is rounded in order to coöperate with the rounded vertical recess $c$ of the guard arm C and thus form a fulcrum upon which the guard arm is movable. The outer portion of this guard arm is formed to extend forwardly as indicated at $c'$, beyond the contour line $a$ of the coupler head as best shown in Fig. 4, and the inner portion thereof is provided with upper and lower extensions $c^2$ formed to extend flush with the contour line $a$ of the coupler head when the parts are in locked position as also shown in Fig. 4, these extensions $c^2$ being connected by a vertical web $c^3$ at their ends and which web is spaced away from the body of the guard arm to form an opening $c^4$ therethrough into which the forwardly extending end of the knuckle extension $b'$ may project when the parts are in released and open position as best shown in Fig. 3. Rearwardly of the lower extension $c^2$, guard arm C has an extension $c^5$ forming an automatic releasing piece as will be hereinafter more fully described and the forward surface of which is beveled as indicated at $c^6$ and as best shown in Fig. 9.

Mounted through and vertically movable within upper and lower intermediate openings $a^2$ of the draw head, is a locking pin D, having at its upper end the usual eye $d$ for connection with the arc arm of the coupler shaft (not shown), by flexible means such as a chain as indicated at E in Fig. 1. Intermediate its ends, the forward face of the locking pin D is cut away to form an upwardly facing inclined shoulder $d'$, which coöperates with the lower cam surface $b^4$ of the knuckle extensions $b'$ in order to throw the knuckle to released and open position when the locking pin D is raised, this cutting away of the locking pin also forming a downwardly facing shoulder $d^2$ which in the open position rests upon the upper surface of the knuckle extensions $b'$ and which drops below the surface of the knuckle extensions when the knuckle is thrown inwardly to the limit of its movement, thus locking the knuckle by preventing movement of the extensions $b'$ through the cut away portion of the locking pin between shoulders $d'$ and $d^2$. Lowering movement of the locking pin D is effected solely by gravity. At its side adjacent the knuckle, the locking pin D is provided with a transverse groove $d^3$ which, when the pin is lowered and the knuckle locked, is opposite the rib $b^2$ at the forward end of the knuckle extension $b'$, so that when the parts are under strain in operation rib $b^2$ is moved into groove $d^3$ as best seen by reference to Fig. 4, whereby to prevent the locking pin from creeping upwardly and accidentally releasing the knuckle.

With the parts in the locked position last mentioned and as best seen in Fig. 4, the locking pin D which is movable laterally in slightly larger openings $a^2$ before mentioned of the draw head, is forced under strain against the body of the guard arm C immediately in rear of its inner extension $c^2$ and thus bearing against the guard arm C a solid wall is constituted transversely through the parts extending from the knuckle extension through the locking pin D, guard arm C and its fulcrum rib $a'$ of the draw head to take up the strain and eliminate all danger of breakage. In its locked position it will also be seen that the locking pin D is disposed in the rear of the guard arm extensions $c^2$ between these extensions and the guard arm extension $c^5$ before mentioned, the side of the locking pin D adjacent the guard arm being cut away to provide a downwardly facing inclined shoulder $d^4$ which rests on the inclined face $c^6$ of guard arm projections $c^5$. Thus when the guard arm C is rocked on its fulcrum and its inner portion moved outwardly, the coöperating faces $c^6$ and $d^4$ serve to lift the locking pin and free the knuckle.

The lower draw head opening $a^2$ in which the locking pin D operates is provided with an inwardly projecting lug $a^3$, the extreme lower end of the locking pin D being cut away to provide a downwardly facing shoulder $d^5$ so that when the locking pin is partially raised and its upper portion moved rearwardly as will naturally occur when the locking pin is elevated by movement of the usual controlling shaft with its arc arm, the shoulder $d^5$ is moved above the lug $a^3$ and may rest thereon in what is known as the "lock set" position. In this position the knuckle B is free to swing to open position and it will be noted that, inasmuch as the locking pin D is canted to an angular position as shown in dotted lines in Fig. 2, its upper shoulder $d^2$ will extend forwardly to a degree sufficient for its engagement by the cam shoulder $b^3$ upon the upper ends of the knuckle extension $b'$ whereby when the knuckle is swung to the open position the locking pin will be slightly raised and when its shoulder $d^2$ passes off of the cam face $b^3$ mentioned, closing movement of the knuckle, in which the shoulder $d^2$ will then follow the line of the cam face $b^3$, will force the lower portion of the locking pin rearwardly so that it may drop to locked position free of the lug $a^3$.

Having thus described the particular construction of the coupler head and the several parts contained therein, it is apparent that with two couplers in locked position it is necessary to raise the locking pin D in order that they may be released. This is not, however, necessary in their engagement in locking position as two couplers either one or both of which are constructed as before described may be brought together and secured when their knuckles are in locked positions. In this last mentioned operation, when two couplers approach one another as illustrated in Fig. 6, their knuckles will, if proceeding in a straight line, contact with one another and be thrown against the outer projecting portions $c'$ of the opposite guard arms C, thus rocking these guard arms on their fulcrums $a'$ and throwing their inner portions, which normally lie in the contour of the coupler heads, outwardly so as to cause their extreme inner ends strengthened by the vertical webs $c^3$ to engage their respective knuckles and knock the latter slightly open at the same instant the locking pin D is raised to released position to permit such movement of the knuckles. This action is clearly shown in Fig. 7 and it follows that continued pressure of the coupler heads toward one another causes the knuckles to engage by sliding movement along the contour lines of the opposing coupler heads, the knuckles in this movement engaging the inner projecting portions of the guard arms C whereby to restore the latter to their normal positions and permit the locking pins D to descend by gravity into locked position.

From this it will be seen that I am enabled to provide a coupler which will be wholly automatic in its coupling operation, entirely independent of any particular position of its parts at that time thus obviating the necessity and danger of a brakeman or other operator going between the cars to be coupled as is necessary with the couplers now in use.

It will further be apparent that I am enabled to provide a coupler capable of such automatic action without complicating the the structure of the coupler and without increasing the number of parts thereof or decreasing the natural strength of these parts and that of the coupler considered as a whole.

I claim:—

1. In a coupler, the combination of a draw head, a knuckle pivoted therein at one side and provided with a tail extension, a locking pin movable vertically in the draw head and having a cut out portion for the passage of the said tail extension, a guard arm intermediately fulcrumed within the opposite side of the draw head and having an inwardly projecting portion and an outwardly projecting portion, located upon respectively opposite sides of its fulcrum and the former of which is movable outwardly into engagement with the knuckle when the guard arm is rocked on its fulcrum, and means for raising the locking pin to release the knuckle when the guard arm is rocked on its pivot all for the purpose described.

2. In a car coupler, the combination of a draw head, a knuckle pivoted at one side of the draw head and having a tail extension, a guard arm located at the opposite side of the draw head, said guard arm and said draw head having relatively engaging portions forming a fulcrum intermediate the ends of the guard arm and upon which the latter is movable, a locking pin movable vertically in the draw head and having a cut out portion for the passage of the knuckle extension, said locking pin and the inner portion of the guard arm having relatively engaging means whereby to lift the locking pin when the guard is rocked on its fulcrum, and said guard arm having an outer portion projecting forwardly beyond the contour lines of the draw head, all for the purpose described.

3. In a car coupler, the combination of a draw head, a knuckle pivoted therein at one side and provided with a tail extension, a locking pin movable vertically in the draw head and having means engaging the tail extension to throw the knuckle open, a guard arm intermediately fulcrumed within the opposite side of the draw head and having an inwardly extending portion disposed in the path of movement of the knuckle tail extension and also movable outwardly into engagement with the knuckle when the guard arm is independently rocked on its fulcrum, said guard arm having an outer portion projecting beyond the draw head, and means for raising the locking pin when the guard arm is rocked on its fulcrum, all for the purpose described.

4. In a car coupler, the combination of a draw head having an inner vertical rib at one side, a knuckle pivoted at the opposite side of the draw head and having a tail extension, a guard arm having an intermediate vertical recess engaging the draw head rib to form a fulcrum on which the guard arm is movable, a locking pin movable vertically in the draw head between the guard arm and the knuckle and having a cut out portion for the passage of the knuckle tail extension, said guard arm having an outer portion projecting beyond the draw head and said locking pin and the inner portion of the guard arm having relatively engaging means for lifting the former when the latter is rocked on its fulcrum, all for the purpose described.

5. A car coupling comprising a coupler head having a pivoted knuckle at one side and provided at the opposite side with a guard arm, a locking device for holding the pivoted knuckle in its closed position, and means mounted within the coupler head for operating the locking device to release the knuckle and for opening the latter after the same has been uncoupled, said means including an element projecting at the guard arm and arranged to be engaged and actuated by a companion car coupling to effect the said operations.

6. A car coupling comprising a coupler head having a pivoted knuckle at one side and provided at the opposite side with a guard arm consisting of an inner knuckle confining portion and an outer portion located beyond the engaged knuckle of a companion coupling, a locking device for holding the pivoted knuckle in its closed position, and means mounted within the coupler head for operating the locking device to release the knuckle and for opening the knuckle after the same has been released, said means including an element projecting at the outer portion of the guard arm and arranged to be engaged and actuated by a companion car coupling to effect the said operations.

7. A car coupling including a coupler head provided at one side with a guard arm and having a tapered knuckle at the opposite side, a locking device movable upwardly and downwardly into and out of engagement with the knuckle, and a coupling actuated member mounted within the coupler head and projecting therefrom and arranged to be moved by a companion car coupling, said member having a relatively fixed portion provided with an incline arranged to lift the locking device and release the knuckle when the said member is moved by the said companion coupling.

8. A car coupling including a coupling head having a pivoted knuckle at one side and provided at the opposite side with a guard arm, a locking device movable upwardly and downwardly into and out of engagement with the knuckle, said locking device being provided with an inclined face, and a coupling actuated lever mounted within the coupler head and having a projecting portion arranged to be engaged by a companion car coupling, said lever being also provided with an integral inner or rear portion having an inclined face arranged to engage the inclined face of the locking device for lifting the latter when the said lever is actuated by the said companion coupling.

9. A car coupling comprising a coupler head having a pivoted knuckle at one side and provided at the opposite side with a guard arm, said coupler head being also provided at the guard arm with a bearing, a locking device movable upwardly and downwardly into and out of engagement with the knuckle, a coupling actuated lever consisting of an inwardly curved body portion provided with means for engaging and lifting the locking device, and a laterally extended head fulcrumed in connection with the said bearing.

10. A car coupling including a coupler head provided at one side with a guard arm and having a pivoted knuckle at the opposite side, a locking device for holding the knuckle in its closed position, a coupling actuated lever mounted within the coupler head and having a projecting portion arranged to be engaged by a companion car coupling, said lever being also provided with means for operating the locking device, and means connected with and carried by the lever in the movements thereof for opening the knuckle after the same has been released.

11. In a car coupler, a knuckle, a locking device for holding the knuckle in closed position, and a movable guard arm moved positively by the companion coupler to first automatically operate the locking device to free the knuckle and upon a further movement of the companion coupler through said guard arm to move the guard arm to such position as to allow the locking device to fall by gravity.

12. In a car coupler, a knuckle, a locking device therefor and a movable guard arm receiving the impact of the companion coupler both to open and close the same, said guard arm in its opening movement releasing the knuckle from the locking device, thereby varying the contour of the mouth of the coupler by first widening the same to permit the entrance of the opposing coupler and then narrowing the same as the opposing coupler forces the inner part of the arm rearwardly and to allow the locking of the knuckle.

13. In a car coupler, a knuckle, a locking device therefor and a pivoted guard arm receiving the impact of the opposing coupler to automatically release the knuckle from the locking device, said impact taking place to one side of the pivot of said guard arm, said guard arm having an extension on the opposite side of the pivot constituting a contacting portion to receive the impact of the opposing coupler on a further inward movement to automatically and positively force the portion rearwardly to allow the locking device to fall by gravity.

Witness my signature this 28th day of July, 1916.

C. H. STARK

Witnesses:
C. H. KADIE,
E. L. WILCOX.